Dec. 10, 1968    R. H. NAGY    3,415,242
PLANK-CUTTING SAW
Filed Nov. 7, 1966    2 Sheets-Sheet 1

INVENTOR
Robert H. Nagy
BY
Morsell & Morsell
ATTORNEYS

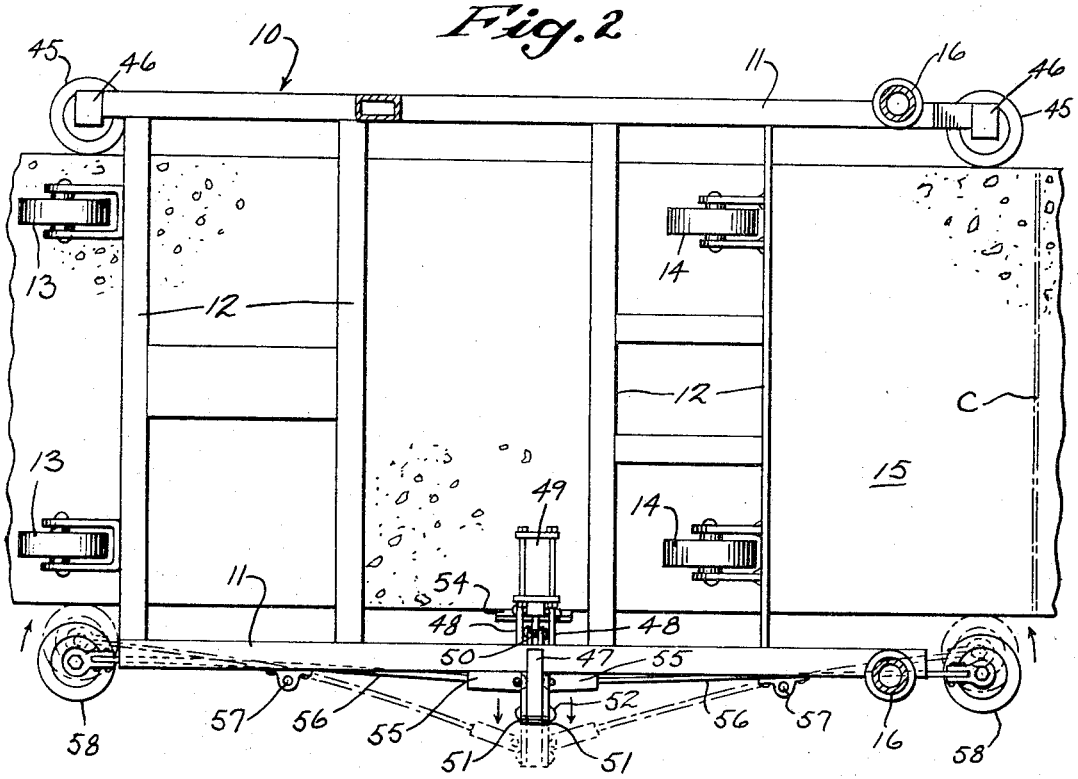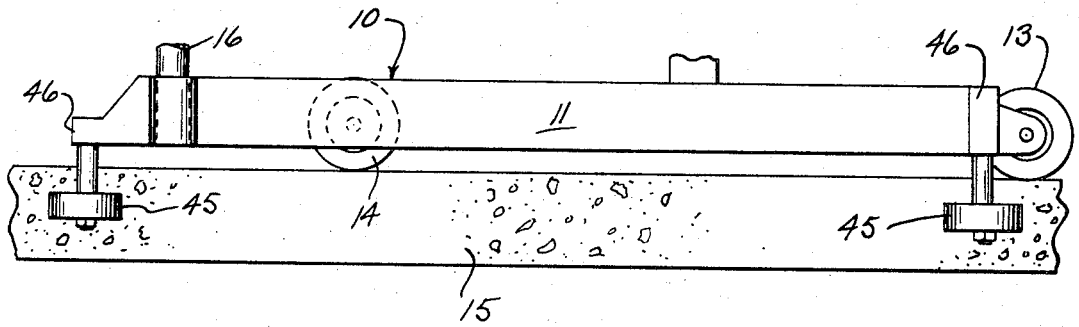

United States Patent Office 3,415,242
Patented Dec. 10, 1968

3,415,242
PLANK-CUTTING SAW
Robert H. Nagy, 2421 N. 111th St.,
Milwaukee, Wis. 53226
Filed Nov. 7, 1966, Ser. No. 592,384
10 Claims. (Cl. 125—13)

This invention relates to improvements in plank-cutting saws.

In the cutting of planks, such as reinforced concrete planks, it is common practice to have a carriage, on which the saw is supported, arranged to travel along the top of the plank. The carriage is adapted to stop at intervals, and the saw is then operable to cut transversely of the plank. Heretofore, the carriage has been equipped with fixed wheels, two on each side, engaging the sides of the plank. With this arrangement it was, in practice, impossible to obtain a perfect fit of the wheels, and usually two wheels would engage the plank while the others would not. This would create an unsquare situation during sawing. In addition, the uneven engagement caused wear on the wheels. Also, it was difficult when sawing to keep the saw at right angles to the work and, if it was not at right angles, there would be substantial wear on the saw blade. Sometimes, if the blade had been bent from previous misuse, the bent blade would tend to pull the saw line out of right-angular relationship, even if it was originally squared. Wear on saw blades which are used for cutting concrete planks is an important element of consideration, as diamond saw blades are often employed, and these are very expensive.

It is a general object of the present invention to obviate the above objections by providing an improved saw carriage having novel squaring means which insures right-angular, transverse cut to substantially lengthen blade life, and which also provides square ends on the plank. Accurately squared ends are important during use in a construction project, as non-squared ends can cause major problems.

A further object of the present invention is to provide a plank-cutting saw as above described wherein the carriage and saw can be readily removed from the last section of plank after the last cut has been made. Such removal is generally done with an overhead crane and, in normal practice, the carriage wheels are engaged with the plank and they commonly drag during removal, with resulting damage. This objection has been overcome with the present invention.

A further object of the invention is to provide an improved plank-sawing carriage having novel means providing a three-point clamping pattern to cause effective squaring action.

A more specific object of the invention is to provide a device as above described wherein the act of engaging the clamping mechanism causes automatic and simultaneous release of the wheels on one side of the plank, there being an intermediate position wherein both the clamp and wheels are free to facilitate removal of the mechanism by an overhead crane.

With the above and other objects in view, the invention consists of the improved plank-cutting saw, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 2 is a sectional view taken approximately on the line 2—2 of FIG. 1, the dot and dash lines indicating the clamping position, with the wheels on one side released;

FIG. 4 is a fragmentary side view showing how the fixed wheels engage the side of the plank.

Figure 1:
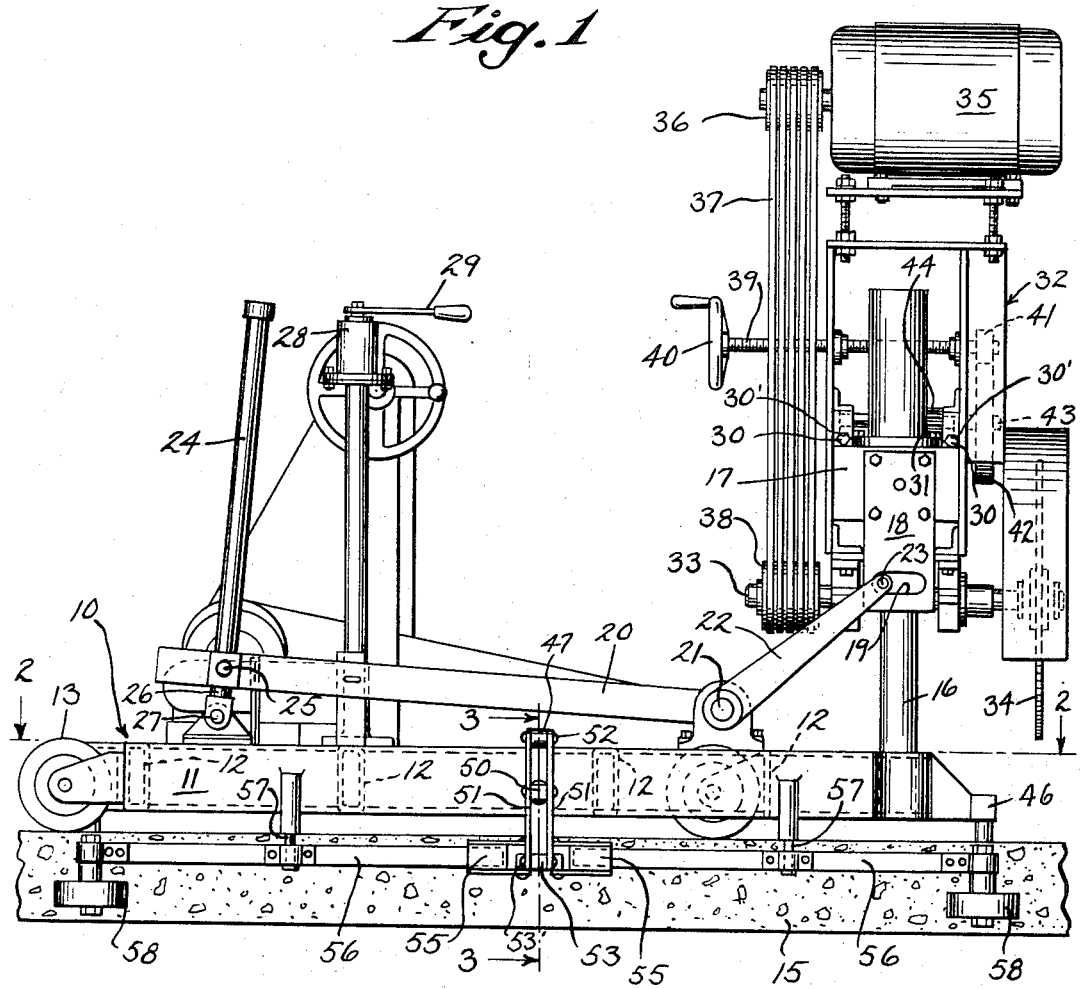
FIG. 1 is a side elevational view of the improved device.

Referring more particularly to the drawing, the carriage, which is designated generally by the numeral 10, includes spaced, hollow side members 11, preferably formed of fabricated steel which is rectangular in cross-section. These side members are connected by transverse members 12. At one end, the carriage is equipped with wheels 13, and near the opposite end with wheels 14 which are adapted to ride on top of the plank 15, such as a concrete plank which is to be sawed in desired lengths. One or more of the wheels may be driven, if desired, by use of any suitable propulsion mechanism.

The carriage has posts 16 projecting upwardly therefrom near one end. Mounted for slidable movement on these posts is a transverse saw-supporting beam 17. Projecting downwardly from the ends of the beam are plates 18 having slots 19. Levers 20 have their inner ends rigidly connected to a transversely-journaled shaft 21. Rigidly connected to the ends of the shaft 21 are upwardly-angled lever arms 22 which have pins 23 in their outer ends coacting with the slots 19. Thus, when the levers 20 are in a downward position as shown, the levers 22 maintain the transverse beam 17 in an elevated position.

Any suitable means may be employed for actuating the levers 20. It is preferred to utilize a suitably-supported hydraulic ram which includes a cylinder 24 having its lower end pivoted to the levers 20 as at 25. The ram includes an extensible piston rod 26 having its lower end pivoted to the carriage as at 27. There may be a suitable hydraulic circuit for the ram 24 with a control valve 28 operable by a handle 29 which is conveniently located for an operator riding the carriage. When the hydraulic ram is extended this will cause upward tilting of the levers 20 and lowering of the beam 17. When the rams are retracted the beam will be elevated as shown in the drawings.

Mounted on the beam 17 are spaced rails 30, each preferably comprising a hexagon bar. There is also a rack 31. A saw unit, designated generally by the numeral 32, includes a saw shaft 33 suitably journaled to extend below the beam 17 and carrying a circular saw or cutting wheel 34 on its outer end. A motor 35, supported on the top of the saw unit 32, has a drive pulley 36 which is connected by endless belts 37 with a pulley 38 rigidly mounted on the saw shaft 33. Also supported on the saw unit 32 is a suitably-journaled shaft 39 having a handwheel 40 on one end, and having a pinion 41 on the opposite end, the pinion engaging a larger gear 42 carried by a shaft 43. The latter is journaled across the saw unit 32 just above the beam 17. The shaft 43 carries a pinion 44 which is adapted to coact with the rack 31. The saw unit 32 also has suitable means such as the grooves 30' coacting with the rails 30 to guide the saw unit in transverse movement. Such transverse movement takes place when the handwheel 40 is rotated to cause the pinion 44 to move the rack 31 and, hence, cause movement of the saw unit transversely of the carriage. It is apparent that manipulation of the hydraulic control handle 29 will cause operation of the levers 20 and 22 to raise and lower the saw blade 34 with respect to the work, and it is also apparent that manipulation of the handwheel 40 will cause the saw to travel transversely as it is cutting.

One of the side members 11 of the carriage has longitudinally-spaced fixed wheels 45 for engagement with one edge of the concrete plank in the manner shown in FIG. 2. These wheels 45, which comprise two of the squaring elements, are suitably supported for rotation on the lower ends of depending arms 46 in the manner illustrated in FIG. 4.

Figure 3:
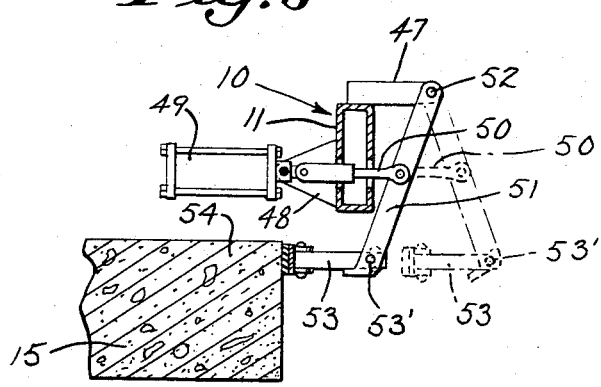
FIG. 3 is a fragmentary sectional view taken on the line 3—3 of FIG. 1.

On the opposite side of the carriage, the side member 11 has a short laterally-projecting arm 47. Suitably supported by brackets 48 which project inwardly from the side member 11, in the manner shown in FIG. 3, is a hydraulic cylinder 49 having an extensible ram 50 supported for movement through the side member 11 and having its outer end pivoted between spaced levers 51 intermediate the length of the latter. The upper ends of these levers 51 are pivotally connected to opposite sides of the arm 47 at the outer end of the latter, as at 52. The lower ends of the levers 24 are pivoted as at 53' to the outer end of a leg 53. The inner end of the leg carries a shoe 54, preferably with a rubber pressure pad and comprising the third squaring element, which is adapted to engage the edge of a plank in the manner shown in FIG. 3, as will be hereinafter explained in greater detail. Any suitable means may be employed at the pivot 53' to keep the leg horizontal. Each of the levers 51 has a socket 55 pivoted to its outer side, within which the ends of spring steel bands 56 are rigidly connected, as shown in FIGS. 1 and 2. Each band is pivoted on a pin 57 which projects downwardly from the frame member 11. The outer end of each steel band spring carries a wheel 58 as illustrated.

*Operation*

In use of the device, when the carriage is travelling longitudinally along the concrete slab the ram 49 is in the extended position of FIG. 2 to hold the wheels 58 inwardly against the edge of the plank 15. Thus the carriage moves freely along the plank so that when it comes to rest the saw blade 34 is already substantially square with the plank. After the carriage has been stopped, the ram 49 is retracted to the position shown in FIG. 3 to bring the clamping shoe 54 into the clamping position as shown. During such clamping movement the lower end of the lever 51 is moved inwardly causing outward pivoting of the wheels 58 free of engagement with the edge of the slabs, as indicated by dot-and-dash lines in FIG. 2. The carriage will now be clamped in square condition with respect to the plank between the three clamping points provided by the two fixed wheels 45 and the shoe 54. The motor 35 for the saw may now be started in operation and the control valve 28 operated to lower the saw into engagement with the plank. During cutting, the handwheel 40 may be manipulated to cause transverse movement of the saw at a selected speed. It is apparent that the arrangement will produce a cut along the straight transverse line C shown in FIG. 2, at a right angle to the plank edges. After one cut has been made, the ram 26 is operated to release the clamping shoe and to simultaneously cause re-engagement of the wheels 58. The carriage is then moved longitudinally along the plank a selected distance to make the next cut. While such movement of the carriage along the plank may be accomplished manually, it is preferred to utilize a drive for one or more of the wheels 13. Such drive is not shown as it forms no part of the present invention.

After the last section of plank has been cut, the hydraulic controls for the ram 49 are operated in a manner well known in the art to extend the ram part way only and thereby move the lever 51 to an intermediate position and to hydraulically lock it in such position. This causes freeing of the clamping shoe 54 without causing re-engagement of the wheels 58. An overhead crane may then be attached to the carriage to lift it off of the plank. Due to the disengaged condition of both the wheels 58 and shoe 54, this upward withdrawal of the carriage can be accomplished without dragging the wheels upwardly on the concrete edges.

Various changes and modifications may be made without departing from the spirit of the invention, and all of such changes are contemplated as may come within the scope of the claims.

What I claim is:

1. In a plank-cutting saw having a carriage adapted for movement longitudinally on top of a plank of the type provided with oppositely-disposed palallel longitudinal edges, and having a saw mounted on the carriage for feed movement relative to the carriage and plank, the improvement comprising squaring means on the carriage having elements positioned for engagement with said oppositely-disposed edges of the plant, said squaring means including mechanism for causing relative movement of said squaring elements at one edge of the plank with respect to said squaring elements at the opposite edge of the plank to clamp the plank therebetween, said squaring elements being so arranged with respect to the saw as to insure cutting of the plank at a predetermined angle with respect to an edge of the plank.

2. A plank-cutting saw as claimed in claim 1 in which there are two longitudinally-spaced squaring elements on one side of the carriage and a single element on the opposite side of the carriage positioned intermediate the spacing of said first two elements to thereby provide a triangular clamping pattern.

3. A plank-cutting saw as claimed in claim 2 in which said two squaring elements which are engageable with one edge of the plank are wheels, and in which the third element which is engageable with the opposite edge of the plank is a clamping shoe.

4. A plank-cutting saw as claimed in claim 3 in which said wheels are fixed, and in which the mechanism for causing relative movement is connected with the shoe for causing clamping movement of the latter.

5. A plank-cutting saw as claimed in claim 4 in which there are also longitudinally-spaced movably-mounted wheels on the side of the carriage having the clamping shoe, and in which there is means for causing movement of the wheels laterally into and out of engagement with the adjacent edge of the plank.

6. A plank-cutting saw as claimed in claim 5 in which there is means whereby the movement of the clamping shoe into clamping engagement automatically causes simultaneous movement of the wheels on the same side of the carriage out of engagement with the edge of the plank.

7. A plank-cutting saw as claimed in claim 5 in which there are arms which are pivoted intermediate their length to the side of the carriage and in which the wheels which are movable laterally into and out of engagement with an edge of the plank are mounted on the ends of said arms, and in which there is common operating means for causing pivotal movement of said arms in a wheel-releasing direction and for simultaneously moving the shoe to clamping position.

8. A plank-cutting saw as claimed in claim 7 in which there is mechanism for moving said common means part way only to an intermediate position to maintain both the shoe and movable wheels out of engagement with the edges of the plank whereby the saw may be lifted off of a plank without causing dragging of the wheels.

9. A plank-cutting saw as claimed in claim 7 in which said arms are spring steel.

10. A plank-cutting saw as claimed in claim 7 in which said common operating means includes a lever pivoted to a side of the carriage and pivotally connected to said shoe and arms between the latter, and includes a hydraulic ram for causing pivotal movement of said lever.

References Cited

UNITED STATES PATENTS 1,420,950   6/1922   Elder.

OTHELL M. SIMPSON, *Primary Examiner.*

U.S. Cl. X.R.

143—47